(12) United States Patent
Dorn et al.

(10) Patent No.: US 7,752,631 B2
(45) Date of Patent: Jul. 6, 2010

(54) DEVICE AND METHOD FOR A GRAPHICAL USER INTERFACE

(75) Inventors: Karlheinz Dorn, Kalchreuth (DE); Mario Plendl, Erlangen (DE); Christian Scharf, Herzogenaurach (DE); Hans-Martin Von Stockhausen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 975 days.

(21) Appl. No.: 11/513,184

(22) Filed: Aug. 31, 2006

(65) Prior Publication Data

US 2007/0074161 A1     Mar. 29, 2007

(30) Foreign Application Priority Data

Sep. 1, 2005     (KR) .................. 10 2005 041 629

(51) Int. Cl.
*G06F 3/00*     (2006.01)

(52) U.S. Cl. ..................................... 719/310; 715/763
(58) Field of Classification Search ............... 719/310; 715/763; 717/108
See application file for complete search history.

(56) References Cited

U.S. PATENT DOCUMENTS

| 6,004,276 | A  | * | 12/1999 | Wright et al. ............... 600/508 |
| 7,506,304 | B2 | * | 3/2009 | Morrow et al. .............. 717/109 |
| 2001/0056460 | A1 |  | 12/2001 | Sahota et al. |
| 2003/0070006 | A1 |  | 4/2003 | Nadler et al. |

* cited by examiner

*Primary Examiner*—Lechi Truong
(74) *Attorney, Agent, or Firm*—Harness, Dickey & Pierce, P.L.C.

(57) ABSTRACT

To enable the adaptation of display units, e.g. of a medical device, to different color display capabilities, an individual library of individual user interface components is used. The individual library of individual user interface components is derived from a generically wrapped library of universal user interface components. It is consequently readily possible to modify the graphical user interface.

17 Claims, 2 Drawing Sheets

DEVICE AND METHOD FOR A GRAPHICAL USER INTERFACE

PRIORITY STATEMENT

The present application hereby claims priority under 35 U.S.C. §119 on German patent application number DE 10 2005 041 629.2 filed Sep. 1, 2005, the entire contents of which is hereby incorporated herein by reference.

FIELD

The invention generally relates to a device having a graphics display which provides a graphical user interface. It further may include a computing unit which contains a library of user interface components for the interaction between an application running on the computing unit and the graphical user interface.

The invention furthermore generally relates to a method for displaying a graphical user interface having at least one user interface component on a graphics display.

BACKGROUND

User interfaces are typically permanently programmed parts of an application that frequently have a specific form which differentiates the user interface of an application from the user interface of the underlying operating system. The user interfaces generally include a multiplicity of user interface components. The interface components may be operating elements such as command buttons or input fields. The behavior of the user interface components in the application-specific user interface can differ from the behavior and appearance of comparable operating elements of the operating system.

Nowadays the appearance of a user interface can be globally changed with the aid of drawing subroutines inserted at a central point in the operating system. All drawing actions are intercepted at a global point in the system and redirected to different drawing subroutines. Since this takes place at a central point in the operating system, there is the risk of instability on the one hand and the loss of performance on the other hand, since all drawing actions are now executed by the central drawing subroutines. In addition, compatibility problems may arise if the central drawing programs are used by different vendors for different purposes.

Current operating systems furthermore offer the option of switching over between different rendering styles. The different rendering styles are referred to as 'themes' or 'visual styles' in the Windows XP operating system for example. Said rendering styles differ with respect to the representation of certain features of a window system. For instance, the corners of a window may have round or angled corners, and the window frames may have different colors.

In order to be able to use the different rendering style options offered in an application, special programming interfaces must be used when developing the application. One disadvantage emerges from the availability of the specification of the different rendering styles. Since these are not openly accessible, the interfaces cannot be used without risk to create a custom new representation of a user interface which differs from the one supplied with the operating system.

A further disadvantage arises from the fact that such a rendering style can only be set globally. As a consequence, it is not possible to use different rendering styles for different monitors which are connected to one computing unit and are managed by one operating system. In the case of medical devices which frequently include both color and grayscale screens, however, the different rendering styles offered by the operating system are usually not suitable for operating both the color and the grayscale screens on one computing unit with a uniform rendering style.

Since the changes to the rendering styles also have a global effect, it is not possible to give individual applications an individual appearance by changing the global rendering style.

Moreover, when an application is updated, for example when the platform is changed, it is often desirable to change or at least modernize the appearance of the user interface. Such a modernization need not be for technical reasons, it may also serve to prevent monotony for customers. Owing to the concomitant costs, such a modernization is typically not performed for all parts of an existing application, but only the new parts of the application to be developed are developed in accordance with the new rendering style.

When implementing individual user interface components, it is also desirable to be independent of suppliers. Particularly in the case where bought-in solutions are used for individual user interface components, it is safer not to be dependent on one vendor.

SUMMARY

A device is created in one embodiment and a method is created in another embodiment, for a user interface that can be flexibly designed.

In the device and the method of at least one embodiment, in each case an individual library of individual user interfaces which is derived from a generically wrapped universal library of universal user interface components is used by an application running on the computing unit.

Since the application accesses the individual library when interacting with the graphical user interface, the application need not be modified if components provided in the universal library by a supplier are exchanged. Moreover, it is possible to create functionalities in the generic wrapping of the universal library which permit adaptation of the individual user interface components to the color display capabilities of the respective graphics display used. In particular it is therefore possible to use the functionalities of universal user interface components on graphics displays with different color display capabilities.

In an example embodiment, the individual library contains classes for individual user interface components which are derived from a generic class. This confers the advantage that common functionalities of the individual user interface components can be implemented in the generic class.

In another example embodiment, the functionalities of the classes for the universal user interface components are encapsulated in the generic class. The functionalities of the universal user interface components can consequently be hidden from the application.

In order, however, to provide the individual user interface components with the functionalities of the universal user interface components, methods for event handling are implemented in the classes for the individual user interface components, which methods delegate the event handling through the generic layer to methods of the universal classes.

In order furthermore to be able to personalize the individual user interface components in accordance with different rendering styles, basic methods for modifying the representation of the individual user interface components are implemented in the generic class.

By way of methods implemented therein, the generic class preferably permits adaptation of the individual user interface components to the color display capabilities of different display units of the graphics display so that medical applications have an attractive appearance on both color and on grayscale screens.

BRIEF DESCRIPTION OF THE DRAWINGS

Further advantages and features of the invention emerge from the description below, in which example embodiments of the invention are explained in detail with reference to the attached drawing, in which.

DETAILED DESCRIPTION OF THE EXAMPLE EMBODIMENTS

Figure 1:
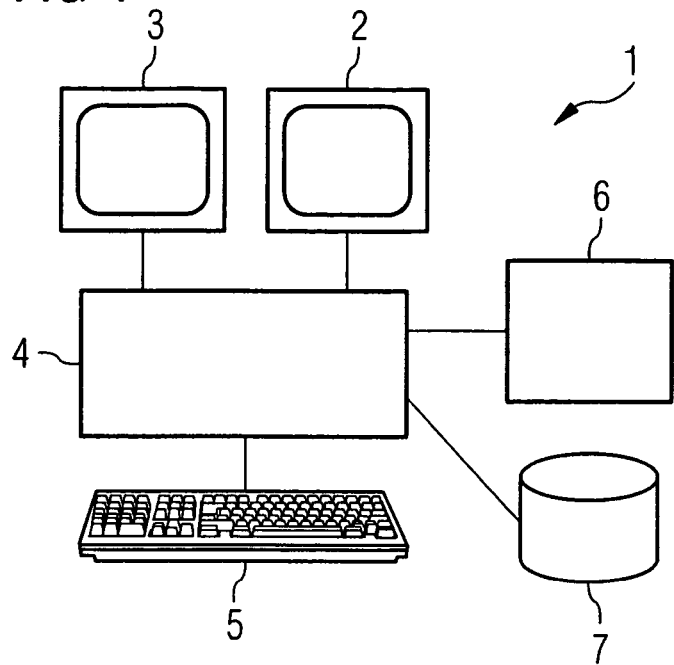
FIG. 1 shows a schematic representation of a medical device having a plurality of monitors.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

FIG. 1 shows a medical device 1 having two monitors 2 and 3, which are each connected to a computing unit 4. The computing unit 4 is in turn connected to input devices, such as a keyboard 5 for example. The computing unit 4 is furthermore connected to a medical device 6. On the one hand the medical device 6 may be an image-generating component, such as a detector of an X-ray apparatus or an ultrasound measuring head of an ultrasound device, as well as further devices which serve to generate medical images. The medical device 6 may however also be a device that serves for patient treatment. One example of such a device are radiotherapy devices or medical devices that serve for the medical care of a patient during an operation. The medical device 6 may also be a data store 7 in which image files relating to a patient's body are stored.

The computing unit 4 may also be connected to a multiplicity of such medical devices 6.

A particular feature of medical devices 1 is that frequently monitors having different color display capabilities are used. For instance, the monitor 2 may be a color monitor and the monitor 3 may be a monitor with grayscale representation. It is advantageous for the user-friendliness of the graphical user interface represented on the monitors 2 and 3 if the respective user interfaces are adapted to the color display capabilities of the respective monitor 2 or 3.

It is furthermore advantageous if the graphical user interface displayed on the monitors 2 and 3 can be modified in a simple manner if required.

Figure 2:
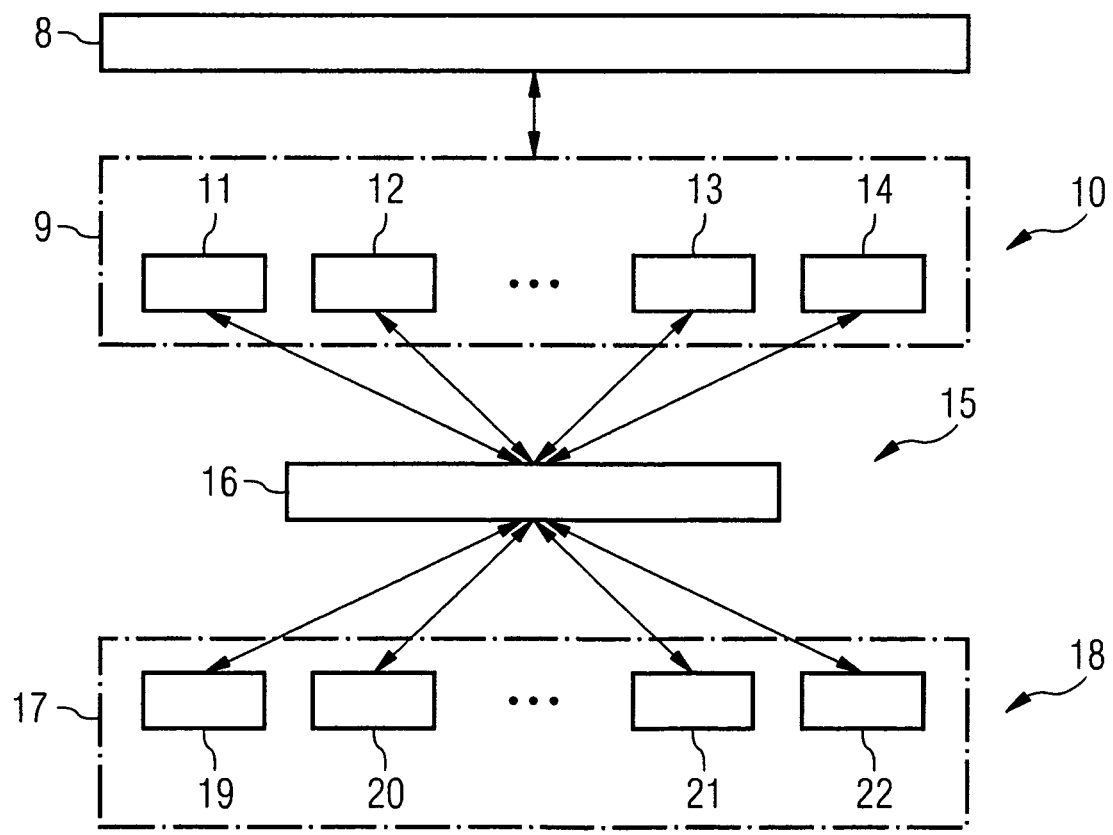
FIG. 2 shows a representation of the architecture of the graphics display of the device from FIG. 1.

The architecture shown in FIG. 2 is provided for this purpose. An application 8 running on the computing unit 4 accesses an individual library 9 in an individual layer 10 in order to represent a graphical user interface. The individual library 9 comprises a multiplicity of individual user interface components, for example operating elements such as an individual command button 11, an individual textbox 12, an individual listbox 13 or an individual slider 14. A generic wrapping 16 of a universal library 17 lying in a universal layer 18 is performed in an underlying generic layer 15. The universal library 17 comprises universal interface components such as a universal command button 19, a universal textbox 20 as well as a universal listbox 21 and a universal slider 22 for example.

The universal library 17 provides the functionalities of the universal user interface components and the basic drawing methods. The generic wrapping 16 encapsulates the universal user interface components and passes on their functionalities to the individual user interface components. As a consequence, there is no need to completely redevelop the functionalities of the individual library 9. Instead, the individual user interface components in the individual library 9 can use the already implemented functionality of the universal user interface components from the universal library 17.

The medical application 8 thus ultimately accesses solely the individual library 9 in the individual layer 10. The individual layer 10 contains the rendering logic for the individual appearance of the user interface. In addition, by means of the individual layer, the actual programming interface provided in the universal library 17 is hidden from the application 8 by a custom interface that remains the same for the medical application 8.

Figure 3:
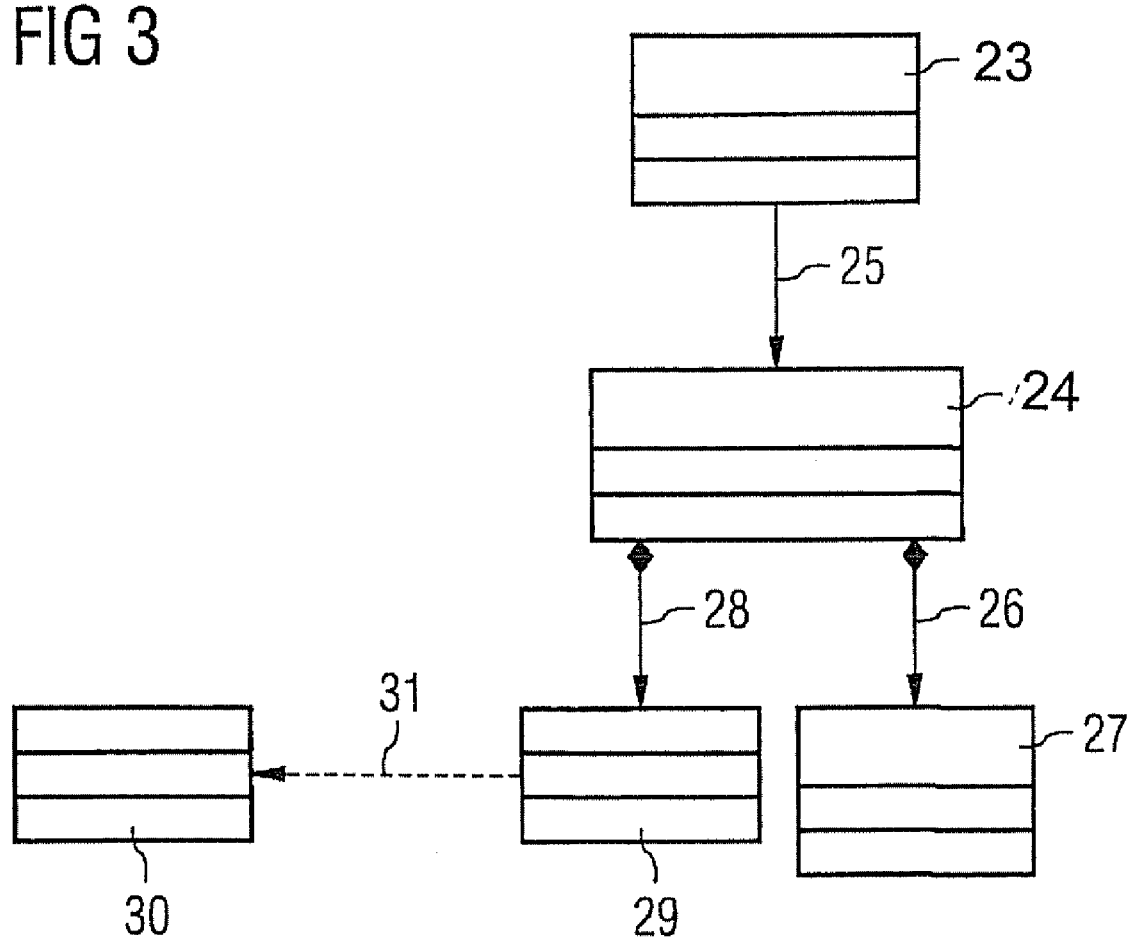
FIG. 3 shows a class diagram of the graphics display.

The programming implementation of the architecture will be explained with reference to FIG. 3. In FIG. 3, individual classes 24 of individual operating elements are derived from a generic class 23 by way of inheritance 25. The functionalities that are common to all individual classes 24 are preferably implemented in the generic class 23. In addition, the generic class 23 communicates the functionalities of universal classes 27 for universal operating elements by means of composition 26. The generic class 23 also communicates display settings 29 by means of composition 28. A dependency 31 exists between the display settings 29 and a monitor setting 30.

The solution described herein confers a range of advantages.

By way of the solution described herein, in particular relatively little effort is required to create an individual library 9 of individual operating elements with individual rendering logic since the basic functionalities of a universal library 17 are used. The universal library 17 can be composed partly or wholly of libraries from suppliers.

Since the amount of custom programming is relatively small, no great development effort is required to change the representation and the behavior of individual operating elements of the user interface of an existing medical application 8 or adapt them to new visual requirements. Only the rendering logic within the individual layer 10 needs to be adapted for this. The application 8 on the other hand need not be modified. There is also little effort required for testing the modification, since the changes can be validated fully on the basis of the individual library 9 without having to retest the entire medical application 8.

When renewing the user interface of a medical application 8, it is consequently possible, without great expense, to offer the already existing parts of the application 8 together with the newly developed parts to the user on the same date.

Furthermore, for the first time the solution described herein offers the ability to adapt even extensive applications 8 to new trends with respect to user interface design at no great expense. An occasional, deliberate refreshing of a long-standing user interface can also be performed. Finally, the solution described herein also enables new rendering concepts to be tested on real applications without great effort.

By programming the rendering logic locally in the generic layer 15 or in the individual layer 10, there is neither the risk of instability nor of performance loss as is the case with a conventional modification of the representation by way of the central drawing subroutines. Moreover, user interfaces that are distributed over a plurality of monitors 2 or 3 with different color display capabilities, which are widespread in medical circles, are also supported. This is because the generic layer 15 supports a configurable monitor definition. Finally, in comparison with using a universal library of operating elements directly, the advantage is conferred that the programming interface of the universal library is fully encapsulated, as a result of which the base of the individual library 9 can be exchanged without great effort at any time at no great expense. This may be necessary for performance or stability reasons, or for economic reasons for example.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc.

Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device, comprising:
   a graphics display including at least one color monitor and at least one monitor with grayscale representation, the graphical display providing a graphical user interface; and
   a computer including an individual library of individual user interface components for interaction between an application running on the computer and the graphical user interface,
   the individual library of individual user interface components is derived from a generic wrapper, the generic wrapper generically wrapping a universal library of universal user interface components and the generic wrapper communicating display settings to the individual library,
   the graphical user interface provided on the at least one color monitor and the at least one monitor with grayscale representation is configured to color display capabilities of a respective monitor depending on a display setting of the respective monitor, and
   the individual library includes classes for individual user interface components, derived from a generic class of a generic wrapper of the universal library.

2. The device as claimed in claim 1, wherein the functionalities of the classes for universal user interface components are encapsulated in the generic class.

3. The device as claimed in claim 2, wherein methods for event handling implemented in the classes for the individual user interface components delegate the event handling through the generic layer to methods of the classes of the universal user interface components.

4. The device as claimed in claim 2, wherein basic methods for modifying the representation of the individual user interface components are implemented in the generic class.

5. The device as claimed in claim 1, wherein methods for event handling implemented in the classes for the individual user interface components delegate the event handling through a generic layer to methods of the classes of the universal user interface components.

6. The device as claimed in claim 5, wherein basic methods for modifying a representation of the individual user interface components are implemented in the generic class.

7. The device as claimed in claim 1, wherein basic methods for modifying a representation of the individual user interface components are implemented in the generic class.

8. The device as claimed in claim 7, wherein the graphics display comprises display units including different color display capabilities, and a basic method in the generic class permits an adaptation of the individual user interface components to the different color display capabilities.

9. The device as claimed in claim 1, wherein basic methods for modifying a representation of the individual user interface components are implemented in the generic class.

10. A method of displaying a graphical user interface, including at least one user interface component, on a graphics display including at least one color monitor and at least one monitor with grayscale representation, the method comprising:

providing a graphics display including at least one color monitor and at least one monitor with grayscale presentation, the graphical display proving a graphical user interface;

executing an application on a computer, the application using an individual library of user interface components for interaction with the graphical user interface, wherein the individual library of user interface components is derived from a generic wrapper, the generic wrapper generically wrapping a universal library of universal user interface components and the generic wrapper communicating display settings to the individual library, the graphical user interface provided on the at least one color monitor and at least one monitor with grayscale representation is configured to color display capabilities of a respective monitor depending on a display settings of the respective monitor, and classes for individual user interface components contained in the individual library are derived from a generic class of the generic wrapper of the universal library.

11. The method as claimed in claim 10, wherein functionalities of the classes for universal user interface components are encapsulated in the generic class.

12. The method as claimed in claim 11, wherein the event handling is delegated through a generic layer to methods of the classes for the universal user interface components by the methods for event handling implemented in the classes for the individual user interface components.

13. The method as claimed in claim 11, wherein basic methods for modifying a representation of the individual user interface components are used in the generic class.

14. The method as claimed in claim 10, wherein the event handling is delegated through a generic layer to methods of the classes for the universal user interface components by the methods for event handling implemented in the classes for the individual user interface components.

15. The method as claimed in claim 10, wherein basic methods for modifying the representation of the individual user interface components are used in the generic class.

16. The method as claimed in claim 15, wherein basic classes implemented in the generic layer are used for adapting different display units to different color display capabilities.

17. A computer readable storage medium including program segments for, when executed on a computer device, causing the computer device to implement the method of claim 10.

* * * * *